United States Patent
Hamai et al.

(10) Patent No.: US 8,604,103 B2
(45) Date of Patent: Dec. 10, 2013

(54) ADDITIVE COMPOSITION FOR HYDRAULIC COMPOSITION

(75) Inventors: Toshimasa Hamai, Wakayama (JP);
Takao Taniguchi, Wakayama (JP);
Masaaki Shimoda, Wakayama (JP);
Makoto Ohkubo, Wakayama (JP);
Hiroshi Danjo, Wakayama (JP);
Nobuyoshi Suzuki, Wakayama (JP)

(73) Assignee: Kao Corporation, Tokyo (JP)

( * ) Notice: Subject to any disclaimer, the term of this patent is extended or adjusted under 35 U.S.C. 154(b) by 159 days.

(21) Appl. No.: 12/920,980

(22) PCT Filed: Mar. 26, 2009

(86) PCT No.: PCT/JP2009/056834
§ 371 (c)(1),
(2), (4) Date: Oct. 5, 2010

(87) PCT Pub. No.: WO2009/119893
PCT Pub. Date: Oct. 1, 2009

(65) Prior Publication Data
US 2011/0021668 A1    Jan. 27, 2011

(30) Foreign Application Priority Data
Mar. 26, 2008    (JP) .................... 2008-080770

(51) Int. Cl.
*C04B 24/26* (2006.01)
*C08K 5/06* (2006.01)
*C08K 5/05* (2006.01)
*C08F 30/02* (2006.01)

(52) U.S. Cl.
USPC ............ 524/5; 524/4; 524/376; 524/377; 524/388; 524/318; 526/274; 526/277

(58) Field of Classification Search
USPC .......... 524/5, 4, 376, 377, 388, 318; 526/274, 526/277
See application file for complete search history.

(56) References Cited

U.S. PATENT DOCUMENTS

| | | |
|---|---|---|
| 2006/0293417 A1 | 12/2006 | Taniguchi et al. |
| 2007/0095256 A1 | 5/2007 | Miyagawa et al. |

FOREIGN PATENT DOCUMENTS

| | | |
|---|---|---|
| EP | 1 767 504 A1 | 3/2007 |
| JP | 6-171996 A | 6/1994 |
| JP | 7-215746 A | 8/1995 |
| JP | 11-157898 A | 6/1999 |
| JP | 11-180747 A | 7/1999 |
| JP | 2000-281403 A | 10/2000 |
| JP | 2000-281413 A | 10/2000 |
| JP | 2001-294466 A | 10/2001 |
| JP | 2001294466 A * | 10/2001 |
| JP | 2002-179448 A | 6/2002 |
| JP | 2002179448 A * | 6/2002 |

(Continued)

OTHER PUBLICATIONS

International Search Report, PCT/JP2009/056834, Jul. 7, 2009.

(Continued)

*Primary Examiner* — Michael Bernshteyn
(74) *Attorney, Agent, or Firm* — Birch, Stewart, Kolasch & Birch, LLP (57) ABSTRACT

This invention relates to an additive composition for a hydraulic composition, which contain a specific copolymer (A) and a compound (B) selected from a specific glycol ether-based compound and a specific glycerin derivate-based compound.

16 Claims, 1 Drawing Sheet

(56) References Cited

FOREIGN PATENT DOCUMENTS

| | | | |
|---|---|---|---|
| JP | 2004-2175 A | | 1/2004 |
| JP | 2006-27995 A | | 2/2006 |
| JP | 2006-52381 A | | 2/2006 |
| JP | 2006027995 A | * | 2/2006 |
| JP | 2006-282414 A | | 10/2006 |
| JP | 2007-77008 A | | 3/2007 |
| JP | 2007-131520 A | | 5/2007 |
| JP | 2007-153638 A | | 6/2007 |
| JP | 2007-186387 A | | 7/2007 |
| JP | 2007-210877 A | | 8/2007 |

OTHER PUBLICATIONS

International Search Report, dated May 12, 2009, for PCT Application No. PCT/JP2009/056842.

English translation of International Preliminary Report on Patentability (Form PCT/IB/373) and Written Opinion of the International Searching Authority (Form PCT/ISA/237) issued on Nov. 9, 2010 in PCT/JP2009/056834.

English translation of International Preliminary Report on Patentability (Form PCT/IB/373) and Written Opinion of the International Searching Authority (Form PCT/ISA/237) issued on Nov. 9, 2010 in PCT/JP2009/056842.

* cited by examiner

ADDITIVE COMPOSITION FOR HYDRAULIC COMPOSITION

FIELD OF THE INVENTION

The present invention relates to an additive composition for a hydraulic composition and a hydraulic composition.

BACKGROUND OF THE INVENTION

A concrete product is produced via a process which involves kneading cement, aggregate, water, a dispersant (water-reducing agent) and the like, casting (filling) the resulting mixture into various forms, and curing it therein. If voids, and hollows considered attributable to insufficient filling, are generated on the surface of the concrete product upon removal from the form (demolding) after the curing step and the texture of concrete surface is deteriorated due to other various factors, then the quality of the product is lowered. At present, concrete products having deteriorated surface texture are repaired manually after demolding. However, this operation requires many hands and much time and is thus regarded as one reason for increasing manufacturing costs.

A variety influencing factors on the surface texture of concrete products are known, among which (1) the amount and quality of voids generated during kneading, (2) the strength of concrete at the time of demolding, and (3) concrete viscosity are said to be important factors.

JP-A 2004-2175 proposes use of an admixture containing a polycarboxylic acid polymer and a polyhydric alcohol/alkylene oxide adduct to obtain a cement composition having such viscosity as to make operation easy. JP-A 2006-282414 discloses a strength improver for cement, which contains glycerin or a glycerin derivative and a specific polycarboxylic acid copolymer. JP-A 2001-294466 discloses an admixture for a hydraulic composition, which contains a specific shrinkage-reducing agent and a specific antifoaming agent. JP-A 2007-77008 discloses a surface texture improver containing a specific amide compound and shows a specific polyoxyalkylene compound as a simultaneously used component.

SUMMARY OF THE INVENTION

The present invention relates to an additive composition for a hydraulic composition, containing (A) one or more copolymers selected from compounds (1), (2) and (3) below shown and (B) one or more compounds selected from a compound represented by the general formula (B1) below shown, a compound represented by the general formula (B2) below shown and a compound represented by the general formula (B3) below shown:

<Compound (1)> a copolymer, or a salt thereof, of an alkenyl ether derivative represented by the general formula (A1) and a monomer represented by the general formula (A3):

$$R^{1a}(A^2O)_{n1}R^{2a} \quad (A1)$$

wherein $R^{1a}$ represents an alkenyl group having 2 to 4 carbon atoms, $A^2O$ represents an oxyalkylene group having 2 to 3 carbon atoms, n1 is a number of 2 to 200 that is the average number of moles of $A^2O$ added, and $R^{2a}$ represents an alkyl group having 1 to 3 carbon atoms;

(A3)

wherein $R^{5a}$ to $R^{7a}$ independently represent a hydrogen atom, a methyl group or $(CH_2)_{p2}COOM^2$, $M^1$ and $M^2$ independently represent a hydrogen atom or a cation, and p2 represents a number of 0 to 2;

<Compound (2)> a copolymer containing, as constituent units, a monomer (i) represented by the general formula (A2) below shown and one or more monomers (ii) selected from compounds represented by the general formulae (A3) above shown and the general formula (A4) below shown, having a molar ratio of (ii)/(i)=70/30 to 95/5;

(A2)

wherein $R^{3a}$ and $R^{4a}$ independently represent a hydrogen atom or a methyl group, p1 represents a number of 0 to 2, $A^3O$ represents an oxyalkylene group having 2 to 3 carbon atoms, n2 is a number of 100 to 300 that is the average number of moles of $A^3O$ added, and X represents a hydrogen atom or an alkyl group having 1 to 3 carbon atoms;

(A4)

wherein $R^{8a}$ represents a hydrogen atom or a methyl group, and Y represents a hydrogen atom or a cation;

<Compound (3)> a copolymer containing, as constituent units, a monomer unit (iii) represented by the general formula (A5) below shown and one or more monomers (ii) selected from compounds represented by the general formulae (A3) and (A4) above shown, having a molar ratio of (ii)/(iii)=60/40 to 90/10;

(A5)

wherein $R^{9a}$ and $R^{10a}$ independently represent a hydrogen atom or a methyl group, p3 represents a number of 0 to 2, $A^4O$ represents an oxyalkylene group having 2 to 3 carbon atoms, n3 is a number of 2 to 90 that is the average number of moles of $A^4O$ added, and X represents a hydrogen atom or an alkyl group having 1 to 3 carbon atoms;

(B1)

wherein $R^{1b}$ represents a hydrogen atom, a methyl group or an ethyl group, and Z represents —OH or —O—$CH_2CH_2$—OH;

(B2)

wherein $A^1$ represents an alkylene group having 2 to 4 carbon atoms, m1, m2 and m3 each represent an integer indicating the number of moles of $A^1O$ added, and the average of the sum in total of m1, m2 and m3 of the compound represented by the general formula (B2) is 0.5 to 2.5;

(B3)

wherein R's may be the same as or different from one another and each represent a hydrogen atom or a group selected from a methyl group, an ethyl group and a propyl group, at least one of R's is group selected from a methyl group, an ethyl group and a propyl group; and $A^{1'}$ represents an alkylene group having 2 to 4 carbon atoms, and m4 is a number of 0 to 2 that is the average number of moles of $A^{1'}O$ added.

Also, the present invention relates to a hydraulic composition containing the additive composition for a hydraulic composition in the present invention, hydraulic powder, aggregate, and water.

DETAILED DESCRIPTION OF THE INVENTION

The present invention provides an additive composition for a hydraulic composition, which is capable of giving a cured product of a hydraulic composition excellent in surface texture, for example a concrete product.

According to the present invention, there is provided an additive composition for a hydraulic composition, which is capable of giving a cured product of a hydraulic composition excellent in surface texture, for example a concrete product. When the additive composition of the present invention is used, the surface texture of a concrete product after demolding is significantly improved and repairing operation can be reduced, thus leading to a reduction in production costs.

<Component (A)>

The component (A) is one or more copolymers selected from the following compounds (1), (2) and (3).

<Compound (1)>

A copolymer, or a salt thereof, of:
an alkenyl ether derivative represented by the general formulae (A1):

(A1)

wherein $R^{1a}$ represents an alkenyl group having 2 to 4 carbon atoms, $A^2O$ represents an oxyalkylene group having 2 to 3 carbon atoms, n1 is a number of 2 to 200 that is the average number of moles of $A^2O$ added, and $R^{2a}$ represents an alkyl group having 1 to 3 carbon atoms, and a monomer represented by the general formula (A3):

(A3)

wherein $R^{5a}$ to $R^{7a}$ independently represent a hydrogen atom, a methyl group or $(CH_2)_{p2}COOM^2$, $M^1$ and $M^2$ independently represent a hydrogen atom or a cation, and p2 represents a number of 0 to 2.

<Compound (2)>

A copolymer containing, as constituent units,
a monomer (i) represented by the general formula (A2):

(A2)

wherein $R^{3a}$ and $R^{4a}$ independently represent a hydrogen atom or a methyl group, p1 represents a number of 0 to 2, $A^3O$ represents an oxyalkylene group having 2 to 3 carbon atoms, n2 is a number of 100 to 300 that is the average number of moles of $A^3O$ added, and X represents a hydrogen atom or an alkyl group having 1 to 3 carbon atoms, and one or more monomers (ii) selected from compounds represented by the general formulae (A3) above and the general formula (A4):

(A4)

wherein $R^{8a}$ represents a hydrogen atom or a methyl group, and Y represents a hydrogen atom or a cation, wherein the molar ratio thereof is (ii)/(i)=70/30 to 95/5.

<Compound (3)>

A copolymer containing, as constituent units,
a monomer unit (iii) represented by the general formula (A5):

(A5)

wherein $R^{9a}$ and $R^{10a}$ independently represent a hydrogen atom or a methyl group, p3 represents a number of 0 to 2, $A^4O$ represents an oxyalkylene group having 2 to 3 carbon atoms, n3 is a number of 2 to 90 that is the average number of moles of $A^4O$ added, and X represents a hydrogen atom or an alkyl group having 1 to 3 carbon atoms, and one or more monomers (ii) selected from compounds represented by the general formulae (A3) and (A4) above, wherein the molar ratio thereof is (ii)/(iii)=60/40 to 90/10.

[Compound (1)]

In the general formula (A1) of the alkenyl ether derivative constituting the compound (1) in the present invention, the alkenyl group having 2 to 4 carbon atoms, represented by $R^{1a}$, is preferably a vinyl group, an allyl group, a methallyl group or the like, among which the allyl group is widely usable and more preferable. $A^2O$ is an oxyethylene group and/or an oxypropylene group, and $(A^2O)_{n1}$ may be formed by adding only one of the two groups or by adding the two groups at random, in block or alternately. $A^2O$ is preferably an oxyethylene group. $R^{2a}$ is an alkyl group having 1 to 3 carbon atoms, and includes a methyl group, an ethyl group, a propyl group etc. A methyl group is preferable.

The average number (n1) of moles of alkylene oxide added is in the range of 2 to 200 and is preferably 2 to 90, more preferably 10 to 70, even more preferably 10 to 50, from the viewpoint of conferring fluidity and low viscosity on fresh concrete.

The monomers represented by the general formula (A3) are preferably unsaturated monocarboxylic acid monomers such as acrylic acid, methacrylic acid and crotonic acid, unsaturated dicarboxylic acid monomers such as maleic anhydride, maleic acid, itaconic anhydride, itaconic acid and fumaric acid, or their alkali metal salts, alkaline earth metal salts or ammonium salts, or mono, di, or trialkyl ammonium salts whose hydroxyl group may be substituted, more preferably acrylic acid, methacrylic acids and alkali metal salts thereof.

The compound (1) in the present invention is a copolymer of the monomer represented by the general formula (A1) and the monomer represented by the general formula (A3), preferably a copolymer, or a salt thereof, wherein the molar ratio of the monomer of the general formula (A1)/monomer of the general formula (A3) is from 25/75 to 50/50. When the monomer of the general formula (A3) is maleic acid, this monomer may be maleic anhydride. The process for producing the compound (1) includes methods described in JP-A 2-163108 and JP-A 5-345647.

The weight-average molecular weight of the compound (1) is preferably 3000 to 300000, more preferably 5000 to 100000, from the viewpoint of conferring stable fluidity on fresh concrete.

Examples of the compound (1) include Malialim EKM and Malialim AKM (manufactured by Nippon Oil & Fats Co., Ltd.) and Super 200 (manufactured by Denki Kagaku Kogyo Kabushiki Kaisha).

[Compound (2)]

The compound (2) in the present invention is obtained by copolymerizing a monomer (i) represented by the general formula (A2) and having 100 to 300 moles of an added alkylene oxide having 2 to 3 carbon atoms on the average per molecule, with a monomer (ii) represented by the general formula (A3) and/or (A4), preferably by the general formula (A3), in a molar ratio of (ii)/(i) of from 70/30 to 95/5. From the viewpoint of conferring stable initial fluidity on fresh concrete, the average number (n2) of moles of alkylene oxide added in the monomer (i) is in the range of 100 to 300, preferably 100 to 250, more preferably 100 to 200, even more preferably 100 to 150. When a plurality of monomers (i) different in n2 are used in the monomers for producing the compound (2), the composition of the monomers is regulated such that the average value of n2 in all monomers (i) is in the range of 100 to 300. For example, when the two monomers (i) are used, one monomer has n2=100 to 290, and the other monomer has n2'=100 to 300, wherein preferably n2≠n2' and n2'≥n2+10, more preferably n2'≥n2+30, and even more preferably n2'≥n2+50. The monomers wherein n2 is less than 100 can also be simultaneously used in such a range that the effect of the present invention is not impaired.

The monomers (i) represented by the general formula (A2) are preferably either esters, with (meth)acrylic acid, of polyalkylene glycol terminated with an alkyl group at one terminal, such as methoxy polyethylene glycol, methoxy polypropylene glycol and ethoxy polyethylene glycol, or (meth) acrylic acid/EO or PO adducts. In the monomers, either EC or PO may be added or EO and PO may be added at random, in block or alternately. The monomer (i) is more preferably an ester of methoxy polyethylene glycol with (meth)acrylic acid, even more preferably an ester, with methacrylic acid, of methoxy polyethylene glycol to which 100 to 200 moles of ethylene oxide have been added on average per molecule.

The monomers represented by the general formula (A3) include those mentioned above for the compound (1).

The monomers represented by the general formula (A4) include allylsulfonic acid, methallylsulfonic acid, their alkali metal salts, alkaline earth metal salts and ammonium salts, and mono, di, or trialkyl ammonium salts whose hydroxyl group may be substituted.

Preferably, the compound (2) is obtained by polymerizing a monomer mixture containing 50% by weight or more, more preferably 80 to 100% by weight, even more preferably 100% by weight, of a combination of a monomer (i) represented by the general formula (A2) and one or more monomers (ii) represented by the general formulae (A3) and (A4).

The monomer (i) of the general formula (A2) constituting the compound (2), and the monomer (ii) of the general formula (A3) and/or the general formula (A4), are copolymerized in a (ii)/(i) molar ratio of from 70/30 to 95/5, and from the viewpoint of conferring stable initial fluidity on fresh concrete, is copolymerized in a (ii)/(i) ratio of preferably 75/25 to 95/5, more preferably 80/20 to 95/5, even more preferably 85/15 to 95/5.

The weight-average molecular weight of the compound (2) is preferably in the range of 5000 to 500000 from the viewpoint of conferring stable initial fluidity on fresh concrete. The compound (2) having a weight-average molecular weight in the range of 20000 to 100000, particularly 30000 to 85000, is more excellent in an effect of conferring initial fluidity on fresh concrete. The weight-average molecular weight is determined by gel permeation chromatography (sodium polystyrene sulfonate (standard)-equivalent molecular weight).

The compound (2) can be produced by a method known in the art. Examples of the method include solution polymerization methods described in, for example, JP-A 7-223852, JP-A 4-209737, and JP-A 58-74552, and such method may be carried out at 50 to 100° C. for 0.5 to 10 hours in the presence of a polymerization initiator such as ammonium persulfate or hydrogen peroxide in water or a lower alcohol having 1 to 4 carbon atoms, to which sodium hydrogen sulfite, mercaptoethanol etc. are added if necessary.

As the starting material of the compound (2), another copolymerizable monomer can also be simultaneously used, and specific examples include acrylonitrile, alkyl (having 1 to 12 carbon atoms) (meth)acrylate, (meth)acrylamide, styrene, and styrenesulfonic acid.

[Compound (3)]

The compound (3) in the present invention is obtained by copolymerizing the monomer (iii) represented by the general formula (A5) and having 2 to 90 moles of an added alkylene oxide having 2 to 3 carbon atoms on the average per molecule, with the monomer (ii) represented by the general formula (A3) and/or (A4), preferably by the general formula (A3), in a (ii)/(iii) molar ratio of from 60/40 to 90/10. From the viewpoint of conferring stable initial fluidity and an ability to maintain fluidity on fresh concrete, the average number (n3) of moles of alkylene oxide added in the monomer (iii) is in the range of 2 to 90, preferably 5 to 70, more preferably 5 to 50, even more preferably 5 to 40. When a plurality of monomers (iii) different in n3 are used as a monomer mixture for producing the compound (3), the composition of the monomers is regulated such that the average value of n3 in all monomers (d) is in the range of 2 to 90. For example, when two monomers (iii) are used, one monomer has n3=2 to 87, and the other monomer has n3'=2 to 90, wherein preferably n3≠n3' and n3'≥n3+3, more preferably n3'≥n3+5, and even more preferably n3'≥n3+10. The monomers wherein n3 is more than 90 can also be simultaneously used in such a range that the effect of the present invention is not impaired.

The monomers (iii) represented by the general formula (A5) are preferably either esters of (meth)acrylic acid and a polyalkylene glycol terminated with an alkyl group at one terminal, such as methoxy polyethylene glycol, methoxy polypropylene glycol and ethoxy polyethylene polypropylene glycol, or EO or PO adducts to (meth)acrylic acid. In the monomers, either EO or PO may be added or EO and PO may be added at random, in block or alternately. The monomer (iii) is more preferably an ester of methoxy polyethylene glycol with (meth)acrylic acid, even more preferably an ester, with methacrylic acid, of methoxy polyethylene glycol to which 2 to 90 moles of ethylene oxide have been added on average per molecule.

The monomers represented by the general formula (A3) and the monomers represented by the general formula (A4) include those mentioned above for the compounds (1) and (2).

Preferably, the compound (3) is obtained by polymerizing a monomer mixture containing 50% by weight or more, more preferably 80 to 100% by weight or more, even more preferably 100% by weight of a combination of a monomer (iii) represented by the general formula (A5) and one or more monomers (ii) represented by the general formulae (A3) and (A4).

The monomer (iii) of the general formula (A5) constituting the compound (3), and the monomer (ii) of the general formula (A3) and/or the general formula (A4), are copolymerized in a (ii)/(iii) molar ratio of from 60/40 to 90/10, and from the viewpoint of conferring an ability to maintain stable fluidity on fresh concrete, is copolymerized in a (ii)/(iii) ratio of preferably 65/35 to 90/10, more preferably 65/35 to 85/15, even more preferably 65/35 to 80/20.

The weight-average molecular weight of the compound (3) is preferably in the range of 5000 to 500000 from the viewpoint of the fluidity of fresh concrete, and the compound having a weight-average molecular weight in the range of 20000 to 100000, particularly 30000 to 85000, is more excellent in an ability to confer fluidity on fresh concrete. The weight-average molecular weight is determined by gel permeation chromatography (sodium polystyrene sulfonate (standard)-equivalent molecular weight).

The compound (3) can be produced by a method known in the art. Examples of the method include solution polymerization methods described in, for example, JP-A 7-223852, JP-A 4-209737, and JP-A 58-74552, and such method may be carried out at 50 to 100° C. for 0.5 to 10 hours in the presence of a polymerization initiator such as ammonium persulfate or hydrogen peroxide in water or a lower alcohol having 1 to 4 carbon atoms, to which sodium hydrogen sulfite, mercaptoethanol etc. are added if necessary.

As the starting material of the compound (3), another copolymerizable monomer can also be simultaneously used, and specific examples include acrylonitrile, alkyl (having 1 to 12 carbon atoms) (meth)acrylate, (meth)acrylamide, styrene, and styrenesulfonic acid.

<Compound (B)>

The component (B) is at least one compound selected from a compound represented by the general formula (B1), a compound represented by the general formula (B2), and a compound represented by the general formula (B3).

In the general formula (B1), $R^{1b}$ is a hydrogen atom, a methyl group or an ethyl group, and Z is —OH or —O—$CH_2CH_2$—OH. The compound of the general formula (B1) includes ethylene glycol, diethylene glycol, 1,2-propanediol, and 1,2-butanediol, among which diethylene glycol is preferable from the viewpoint of improving early strengthening property.

In the general formula (B2), $A^1O$ is an oxyalkylene group having 2 to 4 carbon atoms; that is, $A^1$ is an alkylene group having 2 to 4 carbon atoms, such as an ethylene group, a propylene group or a butylene group. $A^1$ is preferably an alkylene group having 2 to 3 carbon atoms, more preferably an alkylene group having 2 carbon atoms.

In the general formula (B2), m1, m2 and m3 each represent an integer indicative of the number of moles of $A^1O$ added. The integer is 0 or 1 or more. The average of the sum total of m1, m2 and m3 in the compound represented by the general formula (B2) [also referred to hereinafter as compound (B2)] is 0.5 to 2.5, preferably 0.5 to 2.0, more preferably 0.5 to 1.5, from the viewpoint of improving surface texture. The average of the sum in total (m1+m2+m3) of m1, m2 and m3 means the value of the sum in total of m1, m2 and m3 in the compounds of the general formula (B2) that is averaged with the content (weight) of a mixture of the compounds of the general formula (B2). For example, in the case of a mixture of 60% by weight of the compound wherein m1=1 and m2=m3=0 and 40% by weight of the compound wherein m1=m2=m3=0, the sum total of m1, m2 and m3 in the former compound is 1, and the sum total of m1, m2 and m3 in the latter compound is 0, and so the average of the sum total (m1+m2+m3) of m1, m2 and m3 is (1×0.6+0×0.4)=0.6. In the present invention, however, all the compounds (glycerin adducts to which 4 moles or more of alkylene oxide were added) wherein the sum total of m1, m2 and m3 is 4 or more shall be treated as the compound wherein the sum total of m1, m2 and m3 is 4.

The compound of the general formula (B2) can be obtained as a mixture of glycerin and the glycerin adducts to which alkylene oxide was added (the glycerin adduct in which 1 mole of alkylene oxide was added, the glycerin adduct in which 2 moles of alkylene oxide was added, and the glycerin adducts to which 3 moles or more of alkylene oxide were added). That is, it is possible to employ a mixture of the compounds represented by the general formula (B2') (referred to hereinafter as mixture (B2')):

(B2')

wherein $A^1$ is an alkylene group having 2 to 4 carbon atoms, m1', m2' and m3' each represent an integer of 0 or 1 or more indicative of the number of moles of $A^1O$ added, provided that m1', m2' and m3' are integers such that the average of the sum total of m1', m2' and m3' in the mixture becomes 0.5 to 2.5.

In this case, the glycerin adducts to which 1 to 3 moles of alkylene oxide were added (the compounds of the general formula (B2) wherein the sum total of m1, m2 and m3 is an integer of 1 to 3) are preferably contained in the mixture. From the viewpoint of improvement in surface texture and production costs, the proportion of the total of the glycerin adducts to which 1 to 3 moles of alkylene oxide were added (that is, the compounds of the general formula (B2) wherein the sum total of m1, m2 and m3 is an integer of 1 to 3 or the compounds of the general formula (B2') wherein the sum total of m1', m2' and m3' is an integer of 1 to 3) in the mixture is preferably 35% by weight or more, more preferably 40% by weight or more, even more preferably 50 to 100% by weight, and even more preferably 60 to 100% by weight. From the viewpoint of improvement in surface texture, the proportion of the glycerin adduct in which 1 mole of alkylene oxide was added in the mixture (B2) and also in the mixture (B2') is preferably 20 to 100% by weight, more preferably 30 to 100% by weight, even more preferably 40 to 100% by weight, and even more preferably 50 to 100% by weight. From the viewpoint of both improvement in surface texture and production costs, the proportion of the glycerin adduct in which 1 mole of alkylene oxide was added is preferably 10% by weight or more, more preferably 20 to 100% by weight, even more preferably 20 to 60% by weight, and even more preferably 20 to 40% by weight. The proportion of the glycerin adduct in which 2 moles of alkyleneoxides are added is preferably 5% by weight or more, more preferably 10 to 30% by weight. The proportion of the glycerin adduct in which 3 moles of alkyleneoxides are added is preferably 0 to 25% by weight, more preferably 0 to 10% by weight. From the viewpoint of improvement in surface texture, the proportion of glycerin (adduct in which 0 mole of alkylene oxide is added) in the mixture of compound (B2) and also in the mixture (B2') is preferably 0 to 60% by weight, more preferably 0 to 40% by weight and even more preferably 0 to 20% by weight, and from the viewpoint of improvement in surface texture, the proportion of the glycerin adducts to which 4 moles or more of alkylene oxide were added is preferably 0 to 30% by weight, more preferably 0 to 15% by weight and even more preferably 0 to 5% by weight. From the viewpoint of surface texture, the total proportion of glycerin and the glycerin adducts to which 4 moles or more of alkylene oxide were added is 60% by weight or less, more preferably 50% by weight or less, even more preferably 40% by weight or less.

The mixture of compounds (B2) may be used as component (B). In this case, the sum in total of m1, m2 and m3 is 0.5 to 2.5 on the average. The average of the sum in total of m1, m2 and m3 of the mixture can be calculated according to the above mentioned method for the compounds (B2). Preferable ranges of the average of the sum in total of m1, m2 and m3 of the mixture are applied according to those of the compounds (B2). Then component (B) may include compounds where the average of m1, m2 and m3 fall within the above mentioned range and no distribution appears in the added mole number, a mixture of compounds, for example, having the sum in total of m1, m2 and m3 of 1 or 2.

In the present invention, the mixture of compounds (B2) shall include one of compounds of the general formula (B2) wherein the sum in total of m1, m2 and m3 is an integer of 1 to 3. That is, use of the mixture includes use of only one compound of the general formula (B2) wherein the sum total of m1, m2 and m3 is 1, 2 or 3.

By changing the kind of a catalyst and regulating the reaction conditions in producing the compound (B2), a mixture in which the compounds (B2) different in the number of moles of alkylene oxide added are distributed in different ratios can be produced. For example, not only glycerin and the alkylene oxide to which 1 mole of alkylene oxide was added, but also a mixture wherein glycerin and the glycerin oxides (to which 1, 2, 3, 4 or more of alkylene oxide were added) are present in different ratios, can be obtained by changing the kind of a catalyst and the reaction conditions. The average number of moles of alkylene oxide added can be regulated depending on the molar ratio of glycerin to alkylene oxide used in the reaction. When the molar ratio of alkylene oxide to glycerin is increased, the average number of moles of alkylene oxide added is increased, while when the molar ratio is decreased, the average number of moles of alkylene oxide added is decreased.

The acid catalyst that can be used in production of the mixture of compounds (B2) includes Lewis acids and Friedel-Crafts catalysts, and typical examples include a boron trifluoride/ether complex, tin tetrachloride, indium chloride, and metal perfluoroalkylsulfonates such as lanthanum trifluoromethanesulfonate, lanthanum pentafluoromethanesulfonate, yttrium trifluoromethanesulfonate, yttrium pentafluoromethanesulfonate, zinc trifluoromethanesulfonate, zinc pentafluoromethanesulfonate, copper(II)trifluoromethanesulfonate, and copper(II)pentafluoromethanesulfonate. The solid catalyst that can be used in production of the mixture of the compound (B2) includes complex metal oxide catalysts such as hydrotalcite or a magnesium oxide to which a metal ion such as aluminum ion was added. When Lewis acid is used as the acid catalyst, a mixture of the compounds having a narrow distribution of the numbers of moles of alkylene oxide added tends to be obtained.

The reaction conditions under which a mixture of the compounds (B2) is produced are that the amount of the catalyst is preferably 0.001 to 0.1 mole (0.1 to 10 mol %) per active hydrogen in glycerin, the reaction temperature is preferably 50 to 180° C., and when the acid catalyst or solid catalyst is used, the reaction temperature is preferably 50 to 100° C. and the reaction pressure is preferably 0.1 to 0.5 MPa. When the reaction temperature is decreased, a mixture of the compounds having a narrow distribution of the numbers of moles of alkylene oxide added is obtained, while when the reaction temperature is increased, the distribution of the numbers of moles of alkylene oxide added tends to be broadened.

In the general formula (B3), R's may be the same or different and each represent a hydrogen atom or a group selected from a methyl group, an ethyl group and a propyl group, and at least one of R's is a group selected from a methyl group, an ethyl group and a propyl group, each of which is an alkyl group having 1 to 3 carbon atoms. The compounds of the general formula (B3) preferably have each a hydrogen atom and an alkyl group having 1 to 3 carbon atoms. From the viewpoint of improving early strengthening property, the alkyl group having 1 to 3 carbon atoms is preferably a methyl group or an ethyl group, more preferably a methyl group. The alkyl group having 1 to 3 carbon atoms is located preferably at position 1 or 3 in glycerin (propane-1,2,3-triol). In the general formula (B3), $A^{1'}O$ is an oxyalkylene group having 2 to 4 carbon atoms, that is, $A^{1'}$ is an alkylene group having 2 to 4 carbon atoms, such as an ethylene group, a propylene group and a butylene group. $A^{1'}$ is preferably an alkylene group having 2 to 3 carbon atoms, more preferably an alkylene group having 2 carbon atoms.

In the general formula (B3), m4 represents the average number of moles of $A^{1'}O$ added and is a number of 0 to 2, preferably 0 to 1, more preferably substantially 0, from the viewpoint of improving early strengthening property.

The compound of the general formula (B3) includes a monoether or diether between glycerin (propane-1,2,3-triol) and a monohydric alcohol having 1 to 3 carbon atoms, and examples include 2-alkoxypropane-1,3-diol, 3-alkoxypropane-1,2-diol, 2,3-dialkoxypropane-1-ol, and compounds derived therefrom by adding an alkylene group having 2 to 4 carbon atoms to an alcohol at position 1. Among them, the compounds wherein an alkylene group having 2 to 4 carbon atoms is not added are preferable. The compound of the general formula (B3) is preferably a monoether between glycerin (propane-1,2,3-triol) and a monohydric alcohol having 1 to 3 carbon atoms, such as 2-alkoxypropane-1,3-diol and 3-alkoxypropane-1,2-diol. Specific examples include 2-methoxypropane-1,3-diol, 2-ethoxypropane-1,3-diol, 3-methoxypropane-1,2-diol, and 3-ethoxypropane-1,2-diol. In the case of propane-1,2,3-triol, the degree of etherification is preferably 0.2 to 0.8, more preferably 0.3 to 0.7, per mole of hydroxyl group before etherification, that is, per mole of hydroxyl group of glycerin.

The compound of the general formula (B3) can be produced by a method described in, for example, JP-A 2001-213827. Specifically, a glycerin-containing solution obtained through ester exchange reaction between natural fats and oils and monohydric alcohols such as methanol can be subjected to known acid decomposition, filtration, water addition, oil separation, activated carbon treatment and ion exchange treatment, then distilled for example at 9 kPa and 120° C. to distill water away and then distilled for example at 0.1 kPa and 180° C. to give, as a distillate, the compound of the general formula (B3). The compound of the general formula (B3) wherein m4 is not 0 can be obtained in the same manner as for the compound of the general formula (B2) by adding alkylene oxide. The average number, and the distribution of numbers, of moles of the oxyalkylene group added can be regulated in the same manner as for the compound of the general formula (B2) by the amount of alkylene oxide charged, selection of the catalyst, and the reaction temperature.

The compound of the general formula (B3) wherein m4 is 0 can be easily produced industrially by a method including the following steps 1 to 3:

Step 1: step of reacting fats and oils with monohydric alcohols having 1 to 5 carbon atoms, Step 2: step of separating the product obtained in the step 1 into oil and water, and Step 3: step of distilling the aqueous phase obtained in the step 2 to give the compound of the general formula (B3) as a distillate.

[Step 1]

The fats and oils used in the step 1 include naturally occurring vegetable fats and oils and animal fats and oils. The vegetable fats and oils include coconut oil, palm oil, and palm kernel oil, and the animal fats and oils include tallow, lard, and fish oil.

Specific examples of the monohydric alcohols having 1 to 3 carbon atoms used in the step 1 include monohydric alcohols having 1 to 3 carbon atoms, such as methanol, ethanol, n-propanol and 2-methylethanol.

From the viewpoint of attaining a good reaction rate, the molar ratio of monohydric alcohols to fats and oils is preferably 4.5 times or more, more preferably 6 times or more. From the viewpoint of effecting the reaction economically by reducing the amount of alcohols recovered, the molar ratio of alcohols to fats and oils is preferably 50 times or less, more preferably 30 times or less, even more preferably 15 times or less. If necessary, the fats and oils may be diluted with a diluent. The diluent includes, but is not limited to, xylene, toluene, hexane, tetrahydrofuran, acetone, ether, and fatty acid alkyl esters.

The reaction in the step 1 may be carried out in the absence of a catalyst, but preferably a homogeneous or heterogeneous catalyst known in the art is used. As the homogeneous catalyst, an alkali catalyst such as sodium hydroxide can be preferably used. The heterogeneous catalyst is not particularly limited insofar as it is a catalyst having alcoholysis reaction activity, and examples thereof include sodium carbonate and sodium bicarbonate as described in JP-A 61-254255 and crystalline titanium silicate, crystalline titanium aluminum silicate, amorphous titanium silicate and their corresponding zirconium compounds as described in EP0623531B1. In a preferable mode, a weakly acidic, acid catalyst described later is used.

The reaction temperature in the step 1 is preferably 100 to 250° C., more preferably 150 to 240° C., from the viewpoint of attaining a sufficient catalyst activity to increase the reaction rate and of improving the formation of ethers between glycerin and monohydric alcohols.

The reaction system in the step 1 may be either a batch or continuous system and may be a vessel type reactor having a stirrer or a fixed bed reactor packed with a catalyst.

When the reaction is carried out in the vessel type reactor, the amount of the catalyst used is preferably 1 wt % or more, more preferably 3 wt % or more, even more preferably 5 wt % or more, based on the fats and oils, from the viewpoint of attaining sufficient activity to complete the reaction in a short time. From the viewpoint of keeping a sufficiently suspended state under stirring, the amount of the catalyst used is preferably 20 wt % or less, more preferably 17 wt % or less, even more preferably 15 wt % or less, based on the fats and oils. The reaction is carried out usually at normal pressures, but may be carried out under increased pressure or under reduced pressure. Under a reduced pressure, a gas/liquid/solid reaction can be carried out by gasifying an alcohol at a temperature not higher than the boiling point at the atmospheric pressure of the used alcohol. Under an increased pressure, on the other hand, a liquid/liquid/solid reaction can be carried out by preventing the alcohol from evaporating at a temperature not lower than the boiling point at the atmospheric pressures of the alcohol.

When the reaction is continuously carried out in a fixed bed reactor, the liquid hourly space velocity (LHSV) based on the fats and oils is preferably not lower than 0.02/hr, more preferably not lower than 0.1/hr, from the viewpoint of increasing productivity per unit volume of the reactor to effect the reaction economically. From the viewpoint of attaining a sufficient reaction rate, the LHSV is preferably not higher than 2.0/hr, more preferably not higher than 1.0/hr. The reaction pressure is preferably 0.1 to 10 MPa, more preferably 0.5 to 8 MPa. When the reaction is carried out in a liquid/liquid/solid system, the reaction pressure is established according to the vapor pressure and reaction temperature of the monohydric alcohols.

When a fixed bed reactor is used, feeding a monohydric alcohol of the present invention is conducted preferably by pseudo- (or similar) countercurrent operation which is co-current operation in each fixed bed reactor, but is judged to be countercurrent operation in view of the whole facilities.

[Step 2]

Step 2 is a step of separating the product obtained in the step 1 into oil and aqueous phases. The separation method is not particularly limited and the product can be separated by methods known in the art, such as separation by leaving the product (stationary separation) or condensation separation. The separation temperature is preferably 80° C. or less, more preferably 70° C. or less, even more preferably 60° C. or less. The separated oil phase contains fatty acid alkyl esters, the starting materials and reaction intermediate glycerides, as well as a very small amount of water, monohydric alcohols, glycerin etc. On the other hand, the aqueous phase contains the compound of the general formula (B3), glycerin, water and monohydric alcohols.

[Step 3]

Step 3 is a step of distilling the aqueous phase obtained in the step 2 to give the compound of the general formula (83) as a distillate. The aqueous phase is distilled initially under the conditions of a temperature of 70 to 140° C. and a pressure of 6.5 to 27 kPa to distill away components (water, lower alcohols etc.) not corresponding to the compound of the general formula (B3) and then under the conditions of a temperature of 130 to 180° C. and a pressure of 0.1 to 0.8 kPa, thereby allowing the compound of the general formula (B3) to be distilled away and recovered. Usually, the distillate is obtained as a mixture containing the compounds of the general formula (B3). As long as the effect of the present invention can be obtained, the distillate can be used directly as a mixture containing one or more compounds of the general formula (B3). The distillate may contain a plurality of different compounds of the general formula (B3). The compound of the general formula (B3) wherein m4 is not 0 can be obtained in the same manner as for the compound of the general formula (B2) by adding alkylene oxide. The average number, and the distribution of numbers, of moles of the oxyalkylene group added can be regulated in the same manner as for the compound of the general formula (B2) by the amount of alkylene oxide charged, selection of the catalyst, and the reaction temperature.

<Additive Composition for a Hydraulic Composition>

In the additive composition for a hydraulic composition in the present invention, the total content of the component (A), in terms of the concentration of the effective component, is preferably 5 to 50% by weight, more preferably 10 to 40% by weight, even more preferably 20 to 35% by weight. The content is preferably 5% by weight or more from the viewpoint of reducing mortar viscosity or preferably 50% by weight or less from the viewpoint of uniform stabilization of products.

In the additive composition for a hydraulic composition in the present invention, the content of the component (B), in terms of the concentration of the effective component, is preferably 5 to 95% by weight, more preferably 10 to 50% by weight, even more preferably 20 to 30% by weight. The content is preferably 5% by weight or more from the viewpoint of improving demolding strength or preferably 95% by weight or less from the viewpoint of uniform stabilization of products.

In the additive composition for a hydraulic composition in the present invention, the weight ratio of the total amount of the components (A)/the total amount of the components (B) in terms of the effective components, that is, the weight ratio of the total amount of the components (B) to the total amount of the components (A) is established such that (A)/(B) is preferably 15/85 to 96/4, more preferably 25/75 to 80/20, even more preferably 40/60 to 80/20, even more preferably 50/50 to 80/20, even more preferably 50/50 to 70/30 from the viewpoint of surface texture. From the viewpoint of balance between the amount of the component (A) added and the effect of improving early strengthening property and surface texture, (B)/(A) is preferably 90/10 to 60/40, more preferably 85/15 to 50/50, even more preferably 80/20 to 60/40. As used herein, the effective component is used interchangeably with solid content. The effective component is determined by introducing about 3 g of a measurement sample into an aluminum foil cup, measuring its weight, drying it at 105° C. for 2 hours, measuring its weight again, and calculating the amount of the effective component from the change in weight before and after drying.

In the additive composition for a hydraulic composition in the present invention, the total content of the components (A) and (B), in terms of the effective components, is preferably 10 to 100% by weight, more preferably 10 to 60% by weight, even more preferably 15 to 40% by weight and even more preferably 20 to 40% by weight, from the viewpoint of handleability of the product.

In the additive composition for a hydraulic composition in the present invention, the component (A) (effective component) and the component (B) (effective component) are used preferably in a total amount of 0.1 to 10% by weight, more preferably 0.2 to 5% by weight, even more preferably 0.2 to 1% by weight, based on the hydraulic powder, from the viewpoint of surface texture.

In the additive composition for a hydraulic composition in the present invention, the component (A) (effective component) is used preferably in an amount of 0.01 to 10% by weight, more preferably 0.1 to 5% by weight, even more preferably 0.1 to 2% by weight, based on the hydraulic powder, from the viewpoint of improving the fluidity of concrete.

In the additive composition for a hydraulic composition in the present invention, the component (B) (effective component) is used preferably in an amount of 0.01 to 1% by weight more preferably 0.05 to 0.5% by weight, even more preferably 0.1 to 0.2% by weight, based on the hydraulic powder, from the viewpoint of improving the fluidity of concrete.

The additive composition for a hydraulic composition in the present invention is used in every inorganic hydraulic powder showing curability by hydration reaction, including every kind of cement. The additive composition for a hydraulic composition in the present invention may be in a powdery or liquid form. In the case of a liquid form, the additive composition is preferably one using water as solvent or dispersion medium (an aqueous solution etc.), from the viewpoint of workability and reduction of environmental burdens.

The cement includes ordinary Portland cement, rapid-hardening Portland cement, ultra-rapid-hardening Portland cement and ecocement (for example JIS R5214 etc.). The additive composition of the present invention may contain blast furnace slag, fly ash, silica fume etc. as hydraulic powder other than cement, or may contain non-hydraulic fine limestone powder etc. Silica fume cement or blast furnace cement, which is mixed with cement, may be used.

The additive composition for a hydraulic composition in the present invention may contain other additives (materials). Examples of these additives include AE agents such as a resin soap, saturated or unsaturated fatty acid, sodium hydroxystearate, lauryl sulfate, alkylbenzenesulfonic acid (salt), alkane sulfonate, polyoxyalkylene alkyl(phenyl)ether, polyoxyalkylene alkyl(phenyl)ether sulfate (salt), polyoxyalkylene alkyl(phenyl)ether phosphate (salt), protein material, alkenylsuccinic acid and α-olefin sulfonate; retardants such as an oxycarboxylic acid type, e.g., gluconic acid, glucoheptonic acid, arabonic acid, malic acid and citric acid, saccharide type such as dextrin, monosaccharides, oligosaccharides and polysaccharides and sugar alcohol type; air entraining agents; thickeners; silica sand; AE water reducing agents; early strengthening agents or promoters such as soluble calcium salts, e.g., calcium chloride, calcium nitrite, calcium nitrate, calcium bromide and calcium iodide, chlorides, e.g., iron chloride and magnesium chloride, sulfates, potassium hydroxide, sodium hydroxide, carbonates, thiosulfates, formic acid (salt) and alkanolamine; foaming agents; waterproof agents such as resinous acid (salt), fatty acid esters, fats and oils, silicone, paraffin, asphalt and wax; blast-furnace slag; fluidizing agents; antifoaming agents such as a dimethylpolysiloxane type, polyalkylene glycol fatty acid ester type, mineral oil type, fat and oil type, oxyalkylene type, alcohol type and amide type; foaming preventives; fly ash; high-performance water-reducing agents such as a melaminesulfonic acid formalin condensate type and aminosulfonic acid type; silica fume; rust preventives such as nitrites, phosphates and zinc oxide; water-soluble polymers such as a cellulose type, e.g., methyl cellulose and hydroxyethyl cellulose, natural product type, e.g., β-1,3-glucan and xanthane gum and synthetic type, e.g., polyacrylic acid amide, polyethylene glycol and EO adducts of oleyl alcohol or reaction products of these EO adducts and vinylcyclohexenediepoxide; and emulsions of polymers such as alkyl(meth)acrylates.

The additive composition for a hydraulic composition in the present invention preferably contains, among those materials described above, the antifoaming agent, more preferably dimethylpolysiloxane or polyalkylene glycol fatty acid ester.

The additive composition for a hydraulic composition in the present invention is useful in the fields of ready-mixed concrete and concrete vibration products and also in all other various concrete fields such as self-leveling concrete, flame retardant concrete products, plaster concrete, gypsum slurry concrete, light-weight concrete or heavy-weight concrete, AE concrete, repairing concrete, prepacked concrete, tremie concrete, foundation improvement concrete, grout concrete, and concretes used in freezing weather.

<Hydraulic Composition>

The present invention provides a hydraulic composition containing the additive composition for a hydraulic composition in the present invention, hydraulic powder, and water. In the additive composition for a hydraulic composition, the components (A) and (B) are used preferably in the above-mentioned ratio to the hydraulic powder.

The hydraulic composition of the present invention is a paste, mortar, concrete or the like containing water and hydraulic powder (cement) and may contain aggregate. The aggregate includes fine aggregate and coarse aggregate, and the fine aggregate is preferably mountain sand, land sand, river sand or crushed sand, and the coarse aggregate is preferably mountain gravel, land gravel, river gravel or crushed stone. Depending on the use, light-weight aggregate may also be used. These terms of aggregate are in accordance with "Concrete So-ran (Comprehensive Bibliography of Concrete)" (published on Jun. 10, 1998 by Gijutsu Shoin). The hydraulic composition can give sufficient strength to concrete upon demolding for example even after curing in air even in a short period of about 1 day in a mold and the product is excellent in surface texture, and thus the hydraulic composition is preferable for production of cured products (molded products) of the hydraulic composition, such as concrete products. The molded products include vibrated molded products such as culverts, side ditches and segments and centrifuged molded products such as poles, piles and fume tubes. In the vibrated molded products, the surface thereof charged into a concrete form is finished smoothly to attain a beautiful outward appearance by using the hydraulic composition. For the centrifuged molded products, those excellent in chargeability can be obtained.

In the hydraulic composition, the water/hydraulic powder ratio (weight ratio (weight %) of water to hydraulic powder in slurry, abbreviated as W/P in usual and as W/C when the powder is cement) can be 65% by weight or less, particularly 20 to 60% by weight, especially 30 to 55% by weight, particularly especially 30 to 50% by weight.

When the hydraulic composition of the present invention contains fine aggregate and coarse aggregate, the fine aggregate percentage (s/a) is preferably 35 to 55% by volume, more preferably 40 to 50% by volume. Based on the volumes of fine aggregate (S) and coarse aggregate (G), s/a is calculated according to $s/a=[S/(S+G)]\times 100$ (volume %). The hydraulic composition preferably contains preferably 600 to 800 kg, more preferably 650 to 750 kg, of fine aggregate per $m^3$ of the uncured hydraulic composition (the hydraulic composition in a fresh state) and preferably 800 to 1200 kg, more preferably 900 to 1100 kg, of coarse aggregate per $m^3$ of the uncured hydraulic composition (the hydraulic composition in a fresh state).

The hydraulic composition of the present invention can be charged into a form or the like by applying vibration acceleration. The vibration method used in charging may be any method of vibrating the composition on a table, in a form, internally, or superficially. Concrete if highly flowable can be charged without vibration. Application of vibration acceleration to the hydraulic composition of the present invention is preferable when the concrete is charged into a form to produce a molded product etc. The hydraulic composition of the present invention can also be compacted by centrifugal molding.

For example, the hydraulic composition of the present invention is kneaded, then charged into a form with or without vibration, thereafter cured under specific curing conditions and removed from the form, thereby being into a concrete product. The strength necessary for removal of the concrete product from the form, although varying depending on the type of the product, is preferably 5 to 20 $N/mm^2$. For attaining such strength, the process preferably has a curing step after charging into a form. In the curing step, steam curing (promotion of strength by heating) is preferably conducted. The curing time is preferably 8 to 20 hours. Curing is carried out for example by a method under the following conditions: the time in which the hydraulic composition is previously left until steam curing is curried out is 0 to 4 hours; the temperature rise rate after introduction into steam is 5 to 30° C./hr.; the top temperature is 40 to 70° C.; the retention time at the top temperature is 0.5 to 6 hours, followed by natural cooling by termination of steam introduction.

The hydraulic composition of the present invention can rapidly attain sufficient strength for demolding and is excellent in surface texture, thus enabling decrease in the top temperature and reduction in retention time at the top temperature, resulting in reduction in the amount of steam used (energy cost). It is estimated that depending on concrete mix and curing conditions, concrete products can be produced for example by curing in air without necessity for steam curing.

It is also estimated that by using the hydraulic composition of the present invention, concrete products having sufficient strength for demolding and being excellent in surface texture can be obtained under the curing conditions where the time in which the composition is previously left until steam curing is curried out is 2 to 4 hours; the temperature rise rate is 10 to 20° C./hr.; the top temperature is 40 to 60° C., followed by natural cooling, and it is estimated that the retention time can be reduced by about 25 to 100%.

EXAMPLES

The present invention is described in detail with reference to the Examples. The Examples are merely illustrative of the present invention and are not intended to limit the present invention.

<Additive Composition for Hydraulic Composition>

(1) Component (A)

As the component (A), copolymers A-1 to A-6 obtained by Production Examples A-1 to A-6 below were used.

Production Example A-1

Production of Copolymer A-1

A glass reaction container (four-neck flask) equipped with a stirrer was charged with 114 g of water, the atmosphere in the reactor was substituted with nitrogen under stirring, and the temperature of the water was raised to 80° C. A solution in which 300 g of 60 weight-% aqueous ω-methoxypolyethylene glycol monomethacrylate (number of moles of ethylene oxide added on average: 120; ester purity: 100%), 11.5 g of methacrylic acid (reagent: Wako Pure Chemical Industries, Ltd.) and 0.98 g of mercaptopropionic acid had been mixed and dissolved, and a solution in which 1.9 g of ammonium persulfate had been dissolved in 45 g of water, were respectively added dropwise to the reaction container over 1.5 hours. Thereafter, the mixture was aged for 1 hour, and then a solution prepared by dissolving 0.8 g of ammonium persulfate in 15 g of water was added dropwise over 30 minutes to the mixture which was then aged for 1.5 hours. During a series of these reactions, the temperature of the reaction system was kept at 80° C. After aging was finished, the reaction mixture was cooled to 40° C. or less, then neutralized with 9.6 g of 48% sodium hydroxide solution to give a copolymer having a weight-average molecular weight of 54000. Thereafter, the solid content of the product was adjusted to 20% with deionized water.

Production Example A-2

Production of Copolymer A-2

A glass reaction container (four-neck flask) equipped with a stirrer was charged with 333 g of water, the atmosphere in the reactor was substituted with nitrogen under stirring, and the temperature of the water was raised to 80° C. A solution prepared by mixing and dissolving 300 g of ω-methoxypolyethylene glycol monomethacrylate (number of moles of ethylene oxide added on average: 23; NK Ester M230G manufactured by Shin-Nakamura Chemical Co., Ltd.), 69.7 g of methacrylic acid (reagent: Wako Pure Chemical Industries, Ltd.) and 6.3 g of mercaptopropionic acid in 200 g of water, and a solution prepared by dissolving 12.3 g of ammonium persulfate in 45 g of water, were respectively added dropwise to the reaction container over 1.5 hours. Thereafter, the mixture was aged for 1 hour, and then a solution prepared by dissolving 4.9 g of ammonium persulfate in 15 g of water was added dropwise over 30 minutes to the mixture which was then aged for 1.5 hours. During a series of these reactions, the temperature of the reaction system was kept at 80° C. After aging was finished, the reaction mixture was cooled to 40° C. or less, then neutralized with 50.2 g of 48% sodium hydroxide solution to give a copolymer having a weight-average molecular weight of 43000. Thereafter, the solid content of the product was adjusted to 20% with deionized water.

Production Example A-3

Production of Copolymer A-3

A glass reaction container (four-neck flask) equipped with a stirrer was charged with 359 g of water, the atmosphere in the reactor was substituted with nitrogen under stirring, and the temperature of the water was raised to 80° C. A solution prepared by mixing and dissolving 300 g of ω-methoxypolyethylene glycol monomethacrylate (number of moles of ethylene oxide added on average: 9; NK Ester M90G manufactured by Shin-Nakamura Chemical Co., Ltd.), 78.1 g of methacrylic acid (reagent: Wako Pure Chemical Industries, Ltd.) and 8.9 g of mercaptopropionic acid in 200 g of water, and a solution prepared by dissolving 17.3 g of ammonium persulfate in 45 g of water, were respectively added dropwise to the reaction container over 1.5 hours. Thereafter, the mixture was aged for 1 hour, and then a solution prepared by dissolving 6.9 g of ammonium persulfate in 15 g of water was added dropwise over 30 minutes to the mixture which was then aged for 1.5 hours. During a series of these reactions, the temperature of the reaction system was kept at 80° C. After aging was finished, the reaction mixture was cooled to 40° C. or less, then neutralized with 56.0 g of 48% sodium hydroxide solution to give a copolymer having a weight-average molecular weight of 41000. Thereafter, the solid content of the product was adjusted to 20% with deionized water.

Production Example A-4

Production of Copolymer A-4

A glass reaction container (four-neck flask) equipped with a stirrer was charged with 687 g of water, the atmosphere in the reactor was substituted with nitrogen under stirring, and the temperature of the water was raised to 80° C. A solution in which 87.4 g of ω-methoxypolyethylene glycol monomethacrylate (number of moles of ethylene oxide added on average: 9; NK Ester M90G manufactured by Shin-Nakamura Chemical Co., Ltd.), 1052 g of 60 weight-% aqueous ω-methoxypolyethylene glycol monomethacrylate (number of moles of ethylene oxide added on average: 120; ester purity: 97%), 25.3 g of methacrylic acid (reagent: Wako Pure Chemical Industries, Ltd.) and 1.5 g of mercaptopropionic acid had been mixed and dissolved, and a solution prepared by dissolving 1.34 g of ammonium persulfate in 12 g of water, were respectively added dropwise to the reaction container over 1.5 hours. Thereafter, the mixture was aged for 1 hour, and then a solution prepared by dissolving 0.7 g of ammonium persulfate in 6 g of water was added dropwise over 30 minutes to the mixture which was then aged for 1.5 hours. During a series of these reactions, the temperature of the reaction system was kept at 80° C. After aging was finished, the reaction mixture was cooled to 40° C. or less, then neutralized with 14.4 g of 48% sodium hydroxide solution to give a copolymer having a weight-average molecular weight of 53000. Thereafter, the solid content of the product was adjusted to 20% with deionized water.

Production Example A-5

Production of Copolymer A-5

A glass reaction container (four-neck flask) equipped with a stirrer was charged with 198 g of water, the atmosphere in the reactor was substituted with nitrogen under stirring, and the temperature of the water was raised to 80° C. A solution prepared by mixing and dissolving 300 g of ω-methoxypolyethylene glycol monomethacrylate (number of moles of ethylene oxide added on average: 23; NK Ester M230G manufactured by Shin-Nakamura Chemical Co., Ltd.), 59.5 g of acrylic acid (reagent: Wako Pure Chemical Industries, Ltd.; purity: 98%) and 6.3 g of mercaptopropionic acid in 200 g of water, and a solution prepared by dissolving 12.3 g of ammonium persulfate in 45 g of water, were respectively added dropwise to the reaction container over 1.5 hours. Thereafter, the mixture was aged for 1 hour, and then a solution prepared by dissolving 4.9 g of ammonium persulfate in 15 g of water was added dropwise over 30 minutes to the mixture which was then aged for 1.5 hours. During a series of these reactions, the temperature of the reaction system was kept at 80° C. After aging was finished, the reaction mixture was cooled to 40° C. or less, then neutralized with 50.2 g of 48% sodium hydroxide solution to give a copolymer having a weight-average molecular weight of 46000. Thereafter, the solid content of the product was adjusted to 20% with deionized water.

Production Example A-6

Production of Copolymer A-6

A glass reaction container (four-neck flask) equipped with a stirrer was charged with 225 g of water and 300 g of polyoxyethylene (average number of moles of ethylene oxide added on average: 30) allyl ether, the atmosphere in the reactor was substituted with nitrogen under stirring, and the temperature of the water was raised to 80° C. A solution prepared by mixing and dissolving 47.4 g of maleic acid (reagent: Wako Pure Chemical Industries, Ltd.; purity: 99%) and 3.7 g of mercaptopropionic acid in 137 g of water, and a solution prepared by dissolving 7.1 g of ammonium persulfate in 90 g of water, were respectively added dropwise to the reaction container over 2.5 hours. Thereafter, the mixture was aged for 2 hours, and then a solution prepared by dissolving 2.8 g of ammonium persulfate in 45 g of water was added dropwise over 60 minutes to the mixture which was then aged for 2 hours. During a series of these reactions, the temperature of the reaction system was kept at 80° C. After aging was finished, the reaction mixture was cooled to 40° C. or less, then neutralized with 26.6 g of 48% sodium hydroxide solution to give a copolymer having a weight-average molecular weight of 31000. Thereafter, the solid content of the product was adjusted to 20% with deionized water.

The copolymers A-1 to A-6 obtained above are summarized in Table 1.

TABLE 1

| | Copolymer | | | | | | | |
|---|---|---|---|---|---|---|---|---|
| | Raw material as monomer 1 | | Raw material as monomer 2 | | Raw material as monomer 3 | | Raw material as monomer 1/ raw material as starting monomer 2/ raw material as monomer 3 (molar ratio) | |
| No. | Kind | General formula | Kind | General formula | Kind | General formula | | Kind |
| A-1 | Methacrylic acid | (A3) | Methoxypolyethylene glycol (120) monomethacrylate | (A2) | — | — | 80/20/0 | Compound (2) |
| A-2 | Methacrylic acid | (A3) | Methoxypolyethylene glycol (23) monomethacrylate | (A5) | — | — | 75/25/0 | Compound (3) |
| A-3 | Methacrylic acid | (A3) | Methoxypolyethylene glycol (9) monomethacrylate | (A5) | — | — | 60/40/0 | Compound (3) |
| A-4 | Methacrylic acid | (A3) | Methoxypolyethylene glycol (120) monomethacrylate | (A2) | Methoxypolyethylene glycol (9) monomethacrylate | (A5) | 50/20/30 | Others |
| A-5 | Acrylic acid | (A3) | Methoxypolyethylene glycol (23) monomethacrylate | (A5) | — | — | 75/25/0 | Compound (3) |
| A-6 | Maleic acid | (A3) | Polyoxyethylene (30) allyl ether | (A1) | — | — | 65/35/0 | Compound (1) |

In Table 1, number shown in parentheses for the monomer 1 is the average number of moles of ethylene oxide added on average.

(2) Glycerin/Ethylene Oxide Adducts

Tables 2 and 3 show a compound distribution of glycerin/EO adducts (mixture) used as a part of the component (B) in the Examples and Comparative Examples below. In the mixtures in Tables 2 and 3, B-4 (EOp=1.0) is obtained in Production Example 1 below, and similarly B-1 (EOp=0.5), B-10 (EOp=1.5), and B-18 (EOp=2.1) were obtained. As used herein, "EOp" is the average number of moles of ethylene oxide added and means the average of the sum total of m1, m2 and m3. Other mixtures were prepared by mixing glycerin with the glycerin/ethylene oxide adducts of known EOp obtained in the production examples such that the mixtures had predetermined EOp.

Production Example 1

Production of Glycerin/Ethylene Oxide Adducts 230.3 g of glycerin and 1.4 g of KOH were introduced into a 2-L autoclave and then heated to 130° C. at a stirring speed of about 600 rpm. Then, the mixture was dehydrated under the conditions of 130° C. and 1.3 kPa for 30 minutes. Thereafter, the reaction mixture was heated to 155° C. The reaction mixture was reacted with ethylene oxide (referred to hereinafter as EO) in an amount of 110.1 g (that is, EO in an amount of 1 mole per mole of glycerin). This reaction was carried out under the conditions where the temperature was 155° C. and the pressure was 0.1 to 0.3 MPa (gauge pressure). After a predetermined amount of EO was introduced, no drop in the pressure came to be observed (after the reaction was finished), and then the reaction mixture was cooled to 80° C. to produce glycerin adducts in which 1 mole of EO had been added on the average (B-4 in the table). EO in these adducts was distributed as follows: unreacted glycerin (EO=0 mole), 36% (% is on a weight basis); the glycerin to which 1 mole of EO had been added, 37%; the glycerin to which 2 moles of EO had been added, 19%; the glycerin to which 3 moles of EO had been added, 6%; and the glycerin to which 4 moles or more of EO had been added, 2%.

The compound distribution of the glycerin/EO adducts was analyzed by gas chromatography under the following conditions:
Column: Frontier UA-1, length 15 m, inner diameter 250 μm, column film thickness 0.15 μm
Carrier gas: helium
Column temperature: temperature rise conditions; initiation temperature 60° C., end temperature 350° C., temperature rise rate 10° C./min.
Detector: FID
Detection temperature: 350° C.

(3) Mixture (B3-1)

A mixture (B3-1) containing the compounds represented by the general formula (B3) was produced by the following method.
(3-1) Production of a Catalyst 9.9 g of ethylphosphonic acid, 27.7 g of 85% orthophosphoric acid and 112.5 g of aluminum nitrate (nonahydrate) were dissolved in 1000 g of water. An aqueous ammonia solution was added dropwise to the mixed solution at room temperature (25° C.) to raise the pH of the solution to 5. During this reaction, gel-like white precipitates were generated. The precipitates were filtered, washed with water, dried at 110° C. for 15 hours, and crushed into a size of 60 mesh or less. To the crushed catalyst was added 10% by weight of alumina sol. The crushed catalyst was then extrusion-molded in size of 1.5 mmφ. The product was calcinated at 250° C. for 3 hours to give a molded solid acid catalyst (referred to hereinafter as catalyst 1). The weak acid point of the resulting catalyst was 1 mmol/g and the strong acid point thereof was below detection limits. As used herein, the weak acid point is a point at which desorption of $NH_3$ occurs in the range of 100 to 250° C. in an ammonia adsorption-desorption process, and the strong acid point is a point at which desorption of $NH_3$ occurs in the range of higher than 250° C. in the ammonia adsorption-desorption process.
(3-2) Production of Mixture (33-1)
Step 1: Esterification Two tube reactors each having an inner diameter of 35.5 mmφ and a length of 800 mmH, having a tube of 6 mm in

TABLE 2

|  |  | EO adducts to glycerin | | | | | | | | |
|---|---|---|---|---|---|---|---|---|---|---|
|  |  | Comparative B-1 | Comparative B-2 | Comparative B-3 | B-1 | B-2 | B-3 | B-4 | B-5 | B-6 |
| Average number of the total m1, m2 and m3 |  | 0 | 0.4 | 3.0 | 0.5 | 0.7 | 0.9 | 1.0 | 1.2 | 1.5 |
| Distribution of EO adducts (weight %) | 0 mole | 100 | 63 | 3 | 57 | 49 | 41 | 36 | 31 | 23 |
|  | 1 mole | 0 | 28 | 11 | 32 | 31 | 36 | 37 | 34 | 31 |
|  | 2 moles | 0 | 8 | 22 | 9 | 15 | 17 | 19 | 21 | 24 |
|  | 3 moles | 0 | 1 | 26 | 2 | 4 | 5 | 6 | 9 | 14 |
|  | 4 moles or more | 0 | 0 | 38 | 0 | 1 | 1 | 2 | 5 | 8 |
|  | Total | 100.0 | 100.0 | 100.0 | 100.0 | 100.0 | 100.0 | 100.0 | 100.0 | 100.0 |
|  | 1 to 3 moles in total* (weight %) | 0 | 37 | 59 | 43 | 50 | 58 | 62 | 64 | 69 |

*The total amount in sum of glycerin adduct having 1 to 3 moles of EO in the glycerine EO adducts (weight %) (the same is applied hereinafter).

TABLE 3

|  |  | EO adducts to glycerin | | | | | | | | | | | | |
|---|---|---|---|---|---|---|---|---|---|---|---|---|---|
|  |  | B-7 | B-8 | B-9 | B-10 | B-11 | B-12 | B-13 | B-14 | B-15 | B-16 | B-17 | B-18 | B-19 |
| Average number of the total m1, m2 and m3 |  | 2.0 | 2.2 | 1.9 | 1.5 | 2.0 | 2.1 | 1.9 | 1.8 | 1.0 | 1.4 | 1.6 | 2.1 | 2.5 |
| Distribution of EO adducts (weight %) | 0 mole | 10 | 18 | 19 | 20 | 24 | 19 | 19 | 15 | 35 | 27 | 18 | 11 | 7 |
|  | 1 mole | 24 | 15 | 24 | 35 | 25 | 24 | 24 | 29 | 37 | 32 | 32 | 24 | 18 |
|  | 2 moles | 29 | 19 | 21 | 27 | 7 | 13 | 21 | 28 | 20 | 24 | 28 | 29 | 25 |
|  | 3 moles | 21 | 19 | 16 | 13 | 18 | 16 | 16 | 18 | 5 | 10 | 15 | 21 | 23 |
|  | 4 moles or more | 16 | 29 | 20 | 5 | 26 | 28 | 20 | 10 | 3 | 7 | 7 | 15 | 27 |
|  | Total | 100.0 | 100.0 | 100.0 | 100.0 | 100.0 | 100.0 | 100.0 | 100.0 | 100.0 | 100.0 | 100.0 | 100.0 | 100.0 |
|  | 1 to 3 moles in total (weight %) | 74 | 53 | 61 | 75 | 50 | 53 | 61 | 75 | 62 | 66 | 75 | 74 | 66 | inner diameter for temperature measurement in the axial direction, were connected in series, and each tube was packed with 500 cm³ catalyst 1. Coconut oil having an acid value of 0.3 mg KOH/g was used as the fats and oils and fed together with methanol (first grade reagent manufactured by Kanto Chemical Co., Ltd.) into the top of the reactor and reacted at a reaction temperature of 170° C. at a liquid hourly space velocity (LHSV) of 0.2/h and at a reaction pressure of 3.0 MPa. The molar amount of methanol fed was 10 times as much as the molar amount of the fats and oils, whereby a reaction mixture was obtained.

Step 2: Oil-Water Separation 500 g of the reaction mixture obtained in the step 1 and 50 g of water were added to a 1000-ml separating funnel, then shaken and left at 25° C. for 30 minutes, thereby being into a glycerin phase (aqueous phase) and an oil phase.

Step 3: Recovery of the Mixture (B3-1) Containing the Compounds Represented by the General Formula (B3)

The glycerin phase obtained in the step 2 was introduced into a 200-ml flask and distilled at 9 kPa and 120° C., thereby distilling methanol and water away. Thereafter, the sample was further distilled at 0.1 kPa and 180° C. to give a mixture (B-1) having an acid value of 0.76 mg KOH/g as a distillate.

The resulting mixture (B3-1) was quantified for the compounds of the general formula (B3) etc. by gas chromatography (OVI-G43 column manufactured by Supelco). The composition of the mixture (B3-1) was as follows:

3-Methoxypropane-1,2-diol: 67.9% by weight
2-Methoxypropane-1,3-diol: 21.9% by weight
1,2,3-Propanetriol: 2.1% by weight
Others: 8.1% by weight (4) Comparative Production Example Comparative Production Example 1

Production of C6 Glyceryl Ether

A glass reaction container (four-neck flask) equipped with a stirrer was charged with 162 g (9 moles) of water, 52 g (0.25 mole) of lauric acid and 6.7 g (0.12 mole) of potassium hydroxide, the atmosphere in the reactor was substituted with nitrogen under stirring, and the temperature of the mixture was raised to 90° C. 494 g (3 moles) of hexyl glycidyl ether (purity 96%) was added dropwise to the mixture over 4 hours. Thereafter, the mixture was aged at 90° C. for 20 hour, and then 6.7 g (0.12 mole) of potassium hydroxide was introduced into the reaction container. Thereafter, the water was distilled away at 90° C. and 10 kPa, and the reaction mixture was further distilled to give hexyl glyceryl ether (expressed in Table 8 as C6 glyceryl ether) (purity: 95%).

<Preparation and Evaluation of Concrete>

(1) Preparation of Concrete

Under the compounding conditions shown in Table 4, cement (C), fine aggregate (S), and coarse aggregate (G1, G2) were introduced into a 30-L forced two-shaft mixer (manufactured by IHI) and then dry-mixed for 10 seconds. Then, kneading water (W) containing the additive composition for a hydraulic composition (used as an aqueous solution with a solid content of 20% by weight), an air-entraining agent (trade name: AE03, manufactured by Kao Corporation; the main component, polyoxyethylene lauryl ether sulfate) and an antifoaming agent (trade name: Antifoaming Agent No. 21, manufactured by Kao Corporation; the main component, fatty acid esters) was added to the dry-kneaded mixture such that the objective slump of 21±1 cm was reached and the entrained air amount of 3±1% was reached. After pouring the kneading water, the mixture was kneaded for 90 seconds. The amount of the additive composition for a hydraulic composition was regulated such that the slump value was reached. In addition, the amounts of the air-entraining agent and the antifoaming agent were regulated such that the amount of air entrained was reached. Formulations (concentrations of the effective components) of the additive compositions for a hydraulic composition are as shown in Tables 5 to 9 (the balance: water) and were added in the amounts shown in Tables 5 to 9 to the kneading water.

TABLE 4

| W/C (weight %) | s/a (Volume %) | Unit amount (kg/m³) | | | | | Set amount of air (Volume %) |
|---|---|---|---|---|---|---|---|
| | | W | C | S | G1 | G2 | |
| 40.0 | 42.0 | 165 | 413 | 735 | 413 | 619 | 2.0 |

Cement (C): Normal Portland cement (mixture of normal Portland cement manufactured by Taiheiyo Cement Corporation and normal Portland cement manufactured by Sumitomo Osaka Cement Co., Ltd. (1:1 by weight), density 3.16)
Fine aggregate (S): land sand from Joyo, FM = 2.67, density 2.56)
Coarse aggregate (G1): crushed stone 2010 from Ibaraki Pref., density 2.60
Coarse aggregate (G2): crushed stone 1005 from Ibaraki Pref., density 2.60
Water (W): tap water (2) Evaluation of Concrete The concrete (fresh concrete) was evaluated for its surface texture, low-foaming property, demolding strength, and mortar viscosity, respectively. The evaluation results are shown in Tables 5 to 9.

(2-1) Evaluation of Surface Texture

Figure 1:
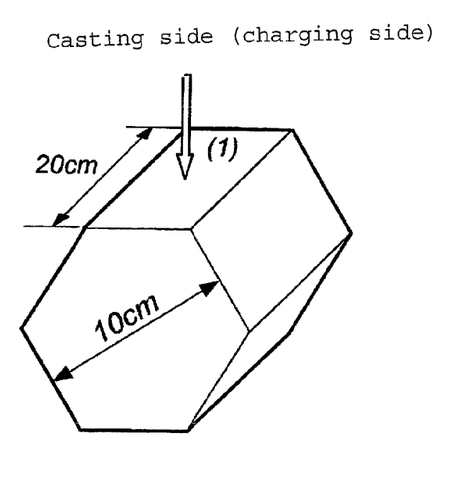
FIG. 1 is a schematic view of a hexagonal cylinder form used in evaluation of surface texture in the Examples and Comparative Examples.

A hexagonal cylinder form that was laid down and could be divided into two in a longer direction (see FIG. 1), which was previously coated with a releasing agent (Liner Seven 90F, Kao Corporation), was charged with the fresh concrete in a 2-layer packaging system by a stabbing bar (each layer: stabbed 10 times) and then vibrated for 30 seconds with a table-type vibrator (C-271a, frequency (vpm) 50 Hz: 2850/60 Hz: 3450, manufactured by Shinnihon Shikenki Co., Ltd.) and cured in air for 24 hours in a room (20° C.), and then the resulting concrete molding was removed from the form. Among the sides of the concrete molding, 7 sides excluding the casting side (that is, the charging side (1) in FIG. 1) were observed visually to count voids with a diameter of about 2 mm or more thereon. The total number of voids on the 7 sides per molding was determined, and the average number of voids on 3 moldings was determined. According to this average number, the surface texture of the concrete was rated in order of deterioration in surface texture with the most beautiful one first, as follows: A, less than 20 voids; B, 20 or more and less than 30 voids; C, 30 or more and less than 50 voids; and D, 50 or more voids.

(2-2) Evaluation of Low-Foaming Property 50 mL of 0.5 wt % aqueous additive composition solution (aqueous solution containing the components (A) and (B) at a total concentration of 0.5 wt % in terms of the effective components in the table) is introduced into a measuring cylinder (200 mL) equipped with a stopper and then vertically shaken 20 times strongly by hand, and immediately thereafter, the amount of foam therein is measured. A is given when the amount of foam is 50 mL or less; B, when the amount is more than 50 mL and 100 mL or less; and C, when the amount is more than 100 mL. A lower amount of foam is indicative of better low-foaming property. When the amount of foam is large, the number of projections and depressions on the surface of cured concrete tends to increase even if the amount of foam in concrete is regulated in a stipulated range by an antifoaming agent at the time of preparing the concrete.

(2-3) Evaluation of Demolding Strength

According to JIS A 1132, the concrete was charged into a cylindrical plastic mold (bottom diameter 10 cm; height 20 cm) in a two-layer packaging system and cured in air for 20 hours in a room at 20° C. to prepare a test sample, and the compressive strength of the test sample was measured according to JIS A1108.

(2-4) Measurement of Mortar Viscosity

The fresh concrete was sieved through a sieve having 5-mm openings to give a mortar sample from which coarse aggregate (G) had been removed. Using a mortar dropping time measuring apparatus of an inverted conical cylinder of 300 mm in length with an upper inlet opening of 100 mm in diameter and a lower discharge opening of 20 mm in diameter, the resulting mortar was charged (in a predetermined amount) into the apparatus with the discharge opening closed with a rubber stopper until the mortar reached the level of the inlet opening. Then, the rubber stopper was removed from the discharge opening, and the time elapsed until the whole of the mortar was discharged was determined (see Examples 1 to 6 etc. in JP-A 2001-215185).

TABLE 5

| | | Component (A) | | Component (B) | | | Low- | Demolding | Mortar |
|---|---|---|---|---|---|---|---|---|---|
| | | Kind | Dosage (weight %) | Kind | Dosage (weight %) | Surface texture | foaming property | strength (N/mm2) | viscosity (second) |
| Comparative example | 1-1 | Copolymer A-1 | 0.2 | — | — | D | A | 12.6 | 7.8 |
| | 1-2 | Copolymer A-1 | 0.2 | Comparative B-1 | 0.2 | D | A | 12.3 | 8.1 |
| | 1-3 | Copolymer A-1 | 0.2 | Comparative B-2 | 0.2 | D | A | 12.6 | 7.6 |
| | 1-4 | Copolymer A-1 | 0.2 | Comparative B-3 | 0.2 | D | C | 12.8 | 6.8 |
| Example | 1-1 | Copolymer A-1 | 0.2 | B-1 | 0.2 | B | A | 13.9 | 7.2 |
| | 1-2 | Copolymer A-1 | 0.2 | B-2 | 0.2 | B | A | 14.0 | 7.1 |
| | 1-3 | Copolymer A-1 | 0.2 | B-3 | 0.2 | A | A | 14.3 | 7.1 |
| | 1-4 | Copolymer A-1 | 0.2 | B-4 | 0.2 | A | A | 14.6 | 7.1 |
| | 1-5 | Copolymer A-1 | 0.2 | B-5 | 0.2 | A | A | 14.8 | 7.0 |
| | 1-6 | Copolymer A-1 | 0.2 | B-6 | 0.2 | A | A | 14.7 | 6.9 |
| | 1-7 | Copolymer A-1 | 0.2 | B-7 | 0.2 | A | A | 14.6 | 6.8 |
| | 1-8 | Copolymer A-1 | 0.2 | B-8 | 0.2 | B | A | 14.0 | 6.8 |
| | 1-9 | Copolymer A-1 | 0.2 | B-9 | 0.2 | A | A | 14.4 | 6.8 |
| | 1-10 | Copolymer A-1 | 0.2 | B-10 | 0.2 | A | A | 14.8 | 7.0 |
| | 1-11 | Copolymer A-1 | 0.2 | B-11 | 0.2 | A | A | 14.2 | 6.9 |
| | 1-12 | Copolymer A-1 | 0.2 | B-12 | 0.2 | A | A | 14.3 | 6.9 |
| | 1-13 | Copolymer A-1 | 0.2 | B-13 | 0.2 | A | A | 14.4 | 6.9 |
| | 1-14 | Copolymer A-1 | 0.2 | B-14 | 0.2 | A | A | 14.7 | 6.8 |
| | 1-15 | Copolymer A-1 | 0.2 | B-15 | 0.2 | A | A | 14.5 | 7.1 |
| | 1-16 | Copolymer A-1 | 0.2 | B-16 | 0.2 | A | A | 14.5 | 7.0 |
| | 1-17 | Copolymer A-1 | 0.2 | B-17 | 0.2 | A | A | 14.6 | 6.9 |
| | 1-18 | Copolymer A-1 | 0.2 | B-18 | 0.2 | A | A | 14.5 | 6.9 |
| | 1-19 | Copolymer A-1 | 0.2 | B-19 | 0.2 | B | A | 14.2 | 6.9 |

TABLE 6

| | | Component (A) | | component (B) | | | Low- | Demolding | Mortar |
|---|---|---|---|---|---|---|---|---|---|
| | | Kind | Dosage (weight %) | Kind | Dosage (weight %) | Surface texture | foaming property | strength (N/mm$^2$) | viscosity (second) |
| Example | 2-1 | Copolymer A-1 | 0.2 | B-10 | 0.2 | A | A | 14.6 | 6.8 |
| | 2-2 | Copolymer A-2 | 0.2 | B-10 | 0.2 | A | A | 14.2 | 6.5 |
| | 2-3 | Copolymer A-3 | 0.2 | B-10 | 0.2 | A | A | 14.0 | 6.3 |
| | 2-4 | Copolymer A-4 | 0.2 | B-10 | 0.2 | A | A | 14.2 | 6.5 |
| | 2-5 | Copolymer A-5 | 0.2 | B-10 | 0.2 | A | A | 14.4 | 6.3 |
| | 2-6 | Copolymer A-6 | 0.2 | B-10 | 0.2 | A | A | 14.1 | 6.4 |
| | 2-7 | Copolymer A-1/copolymer A-2 = 3/7 (weight ratio) | 0.2 | B-10 | 0.2 | A | A | 14.3 | 6.6 |
| | 2-8 | Copolymer A-1/Copolymer A-3 = 3/7 (weight ratio) | 0.2 | B-10 | 0.2 | A | A | 14.2 | 6.5 |
| | 2-9 | Copolymer A-3/Copolymer A-4 = 7/3 (weight ratio) | 0.2 | B-10 | 0.2 | A | A | 14.0 | 6.3 |
| | 2-10 | Copolymer A-1/copolymer A-5 = 3/7 (weight ratio) | 0.2 | B-10 | 0.2 | A | A | 14.6 | 6.5 |
| | 2-11 | Copolymer A-1/copolymerA-6 = 3/7 (weight ratio) | 0.2 | B-10 | 0.2 | A | A | 14.2 | 6.6 |

TABLE 7

| | | Component (A) | | Component (B) | | | Low- | Demolding | Mortar |
|---|---|---|---|---|---|---|---|---|---|
| | | Kind | Dosage (weight %) | Kind | Dosage (weight %) | Surface texture | foaming property | strength (N/mm$^2$) | viscosity (second) |
| Comparative example | 3-1 | Copolymer A-1 | 0.2 | B-10 | 0.000 | D | A | 12.6 | 7.2 |
| Example | 3-1 | Copolymer A-1 | 0.2 | B-10 | 0.010 | A | A | 13.9 | 7.2 |
| | 3-2 | Copolymer A-1 | 0.2 | B-10 | 0.050 | A | A | 14.2 | 7.2 |

TABLE 7-continued

|  | Component (A) | | Component (B) | | Surface texture | Low-foaming property | Demolding strength (N/mm²) | Mortar viscosity (second) |
|---|---|---|---|---|---|---|---|---|
|  | Kind | Dosage (weight %) | Kind | Dosage (weight %) | | | | |
| 3-3 | Copolymer A-1 | 0.2 | B-10 | 0.200 | A | A | 14.6 | 7.1 |
| 3-4 | Copolymer A-1 | 0.2 | B-10 | 0.300 | A | A | 14.7 | 7.1 |
| 3-5 | Copolymer A-1 | 0.2 | B-10 | 0.500 | A | A | 14.4 | 7.0 |
| 3-6 | Copolymer A-1 | 0.2 | B-10 | 1.000 | B | B | 13.9 | 6.9 |

TABLE 8

|  |  | Component (A) | | Component (B) | | Surface texture | Low-foaming property | Demolding strength (N/mm2) | Mortar viscosity (second) |
|---|---|---|---|---|---|---|---|---|---|
|  |  | Kind | Dosage (weight %) | Kind | Dosage (weight %) | | | | |
| Comparative example | 4-1 | Copolymer A-1 | 0.2 | — | — | D | A | 12.6 | 7.8 |
|  | 4-2 | Copolymer A-1 | 0.2 | Glycerine | 0.2 | D | A | 12.3 | 8.1 |
|  | 4-3 | Copolymer A-1 | 0.2 | Butanol | 0.2 | D | A | 12.8 | 7.6 |
|  | 4-4 | Copolymer A-1 | 0.2 | 1,3-butanediol | 0.2 | D | A | 13.2 | 7.6 |
|  | 4-5 | Copolymer A-1 | 0.2 | Butyl diglycol | 0.2 | D | C | 13.1 | 7.2 |
|  | 4-6 | Copolymer A-1 | 0.2 | C6 glyceryl ether | 0.2 | D | C | 12.8 | 7.0 |
|  | 4-7 | Copolymer A-1 | 0.2 | 1,3-propanediol | 0.2 | D | A | 12.6 | 7.4 |
|  | 4-8 | Copolymer A-1 | 0.2 | 3-butoxy-1,2-propanediol | 0.2 | D | A | 12.8 | 7.3 |
| Example | 4-1 | Copolymer A-1 | 0.2 | DEG | 0.2 | A | A | 14.4 | 7.2 |
|  | 4-2 | Copolymer A-1 | 0.2 | EG | 0.2 | A | A | 14.1 | 7.3 |
|  | 4-3 | Copolymer A-1 | 0.2 | 1,2-butanediol | 0.2 | A | A | 14.5 | 7.2 |
|  | 4-4 | Copolymer A-2 | 0.2 | 1,2-butanediol | 0.2 | A | A | 14.2 | 7.0 |
|  | 4-5 | Copolymer A-3 | 0.2 | 1,2-butanediol | 0.2 | A | A | 14.0 | 6.9 |
|  | 4-6 | Copolymer A-4 | 0.2 | 1,2-butanediol | 0.2 | A | A | 14.2 | 7.1 |
|  | 4-7 | Copolymer A-5 | 0.2 | 1,2-butanediol | 0.2 | A | A | 14.4 | 7.0 |
|  | 4-8 | Copolymer A-6 | 0.2 | 1,2-butanediol | 0.2 | A | A | 14.0 | 7.1 |
|  | 4-9 | Copolymer A-1/copolymer A-2 = 3/7 (weight ratio) | 0.2 | 1,2-butanediol | 0.2 | A | A | 14.3 | 7.1 |
|  | 4-10 | Copolymer A-1/copolymer A-3 = 3/7 (weight ratio) | 0.2 | 1,2-butanediol | 0.2 | A | A | 14.2 | 7.0 |
|  | 4-11 | Copolymer A-3/Copolymer A-4 = 7/3 (weight ratio) | 0.2 | 1,2-butanediol | 0.2 | A | A | 14.1 | 7.1 |
|  | 4-12 | Copolymer A-1/copolymer A-5 = 3/7 (weight ratio) | 0.2 | 1,2-butanediol | 0.2 | A | A | 14.4 | 7.1 |
|  | 4-13 | Copolymer A-1/copolymer A-6 = 3/7 (weight ratio) | 0.2 | 1,2-butanediol | 0.2 | A | A | 14.2 | 7.1 |
|  | 4-14 | Copolymer A-1 | 0.2 | 3-methoxy-1,2-propanediol | 0.2 | A | A | 14.3 | 7.2 |
|  | 4-15 | Copolymer A-1 | 0.2 | 3-ethoxy-1,2-propanediol | 0.2 | A | A | 14.1 | 7.2 |
|  | 4-16 | Copolymer A-1 | 0.2 | 3-propoxy-1,2-propanediol | 0.2 | A | A | 13.9 | 7.2 |
|  | 4-17 | Copolymer A-1 | 0.2 | Mixture (B3-1) | 0.2 | A | A | 14.0 | 7.2 |

TABLE 9

|  |  | Component (A) | | Component (B) | | Surface texture | Low-foaming property | Demolding strength (N/mm2) | Mortar viscosity (second) |
|---|---|---|---|---|---|---|---|---|---|
|  |  | Kind | Dosage (weight %) | Kind | Dosage (weight %) | | | | |
| Comparative example | 5-1 | Copolymer A-1 | 0.2 | 1,2-butanediol | 0.000 | D | A | 12.6 | 7.8 |
| Example | 5-1 | Copolymer A-1 | 0.2 | 1,2-butanediol | 0.010 | A | A | 14.0 | 7.3 |
|  | 5-2 | Copolymer A-1 | 0.2 | 1,2-butanediol | 0.050 | A | A | 14.2 | 7.2 |
|  | 5-3 | Copolymer A-1 | 0.2 | 1,2-butanediol | 0.200 | A | A | 14.5 | 7.2 |
|  | 5-4 | Copolymer A-1 | 0.2 | 1,2-butanediol | 0.500 | A | A | 14.9 | 7.0 |
|  | 5-5 | Copolymer A-1 | 0.2 | 1,2-butanediol | 1.000 | B | B | 14.3 | 6.9 |

In the tables, the amount of each component is the amount (weight %) of the effective component relative to the weight of cement. The compounds in the tables are as follows:

C6 glyceryl ether: hexyl glyceryl ether obtained in Comparative Production Example 1

DEG: diethylene glycol (reagent (purity 99%) manufactured by Wako Pure Chemical Industries, Ltd.)

EG: ethylene glycol (reagent (purity 99%) manufactured by Wako Pure Chemical Industries, Ltd.)

The invention claimed is:

1. An additive composition for a hydraulic composition, comprising:
   (A) one or more copolymers selected from the group consisting of compounds (1), (2) and (3) shown below; and
   (B) a mixture of compounds represented by the general formula (B2) shown below
   <compound (1)>
   a copolymer, or a salt thereof, of an alkenyl ether derivative represented by the general formula (A1) and a monomer represented by the general formula (A3):

$$R^{1a}(A^2O)_{n1}R^{2a} \quad (A1)$$

wherein $R^{1a}$ represents an alkenyl group having 2 to 4 carbon atoms, $A^2O$ represents an oxyalkylene group having 2 to 3 carbon atoms, n1 is a number of 2 to 200 that is the average number of moles of $A^2O$ added, and $R^{2a}$ represents an alkyl group having 1 to 3 carbon atoms;

(A3)

wherein $R^{5a}$ to $R^{7a}$ independently represent a hydrogen atom, a methyl group or $(CH_2)_{p2}COOM^2$, $M^1$ and $M^2$ independently represent a hydrogen atom or a cation, and p2 represents a number of 0 to 2;

<compound (2)>
a copolymer comprising, as constituent units, a monomer (i) represented by the general formula (A2) shown below and one or more monomers (ii) selected from the group consisting of compounds represented by the general formulae (A3) above shown and the general formula (A4) shown below, having a molar ratio of (ii)/(i)=70/30 to 95/5;

(A2)

wherein $R^{3a}$ and $R^{4a}$ independently represent a hydrogen atom or a methyl group, p1 represents a number of 0 to 2, $A^3O$ represents an oxyalkylene group having 2 to 3 carbon atoms, n2 is a number of 100 to 300 that is the average number of moles of $A^3O$ added, and X represents a hydrogen atom or an alkyl group having 1 to 3 carbon atoms;

(A4)

wherein $R^{8a}$ represents a hydrogen atom or a methyl group, and Y represents a hydrogen atom or a cation;

<compound (3)>
a copolymer comprising, as constituent units, a monomer unit (iii) represented by the general formula (A5) shown below and one or more monomers (ii) selected from the group consisting of compounds represented by the general formulae (A3) and (A4) above shown, having a molar ratio of (ii)/(iii)=60/40 to 90/10;

(A5)

wherein $R^{9a}$ and $R^{10a}$ independently represent a hydrogen atom or a methyl group, p3 represents a number of 0 to 2, $A^4O$ represents an oxyalkylene group having 2 to 3 carbon atoms, n3 is a number of 2 to 90 that is the average number of moles of $A^4O$ added, and X represents a hydrogen atom or an alkyl group having 1 to 3 carbon atoms;

(B2)

wherein $A^1$ represents an alkylene group having 2 to 4 carbon atoms, m1, m2 and m3 each represent an integer indicating the number of moles of $A^1O$ added, and wherein the average of the sum in total of m1, m2 and m3 of the mixture of compounds represented by the general formula (B2) is 0.5 to 2.5.

2. An additive composition for a hydraulic composition, comprising:
   (A) one or more copolymers selected from the group consisting of compounds (1), (2) and (3) shown below; and
   (B) a mixture of compounds represented by the general formula (B2) shown below
   <compound (1)>
   a copolymer, or a salt thereof, of an alkenyl ether derivative represented by the general formula (A1) and a monomer represented by the general formula (A3):

$$R^{1a}(A^2O)_{n1}R^{2a} \quad (A1)$$

wherein $R^{1a}$ represents an alkenyl group having 2 to 4 carbon atoms, $A^2O$ represents an oxyalkylene group having 2 to 3 carbon atoms, n1 is a number of 2 to 200 that is the average number of moles of $A^2O$ added, and $R^{2a}$ represents an alkyl group having 1 to 3 carbon atoms;

(A3)

wherein $R^{5a}$ to $R^{7a}$ independently represent a hydrogen atom, a methyl group or $(CH_2)_{p2}COOM^2$, $M^1$ and $M^2$ independently represent a hydrogen atom or a cation, and p2 represents a number of 0 to 2;

<compound (2)>
a copolymer comprising, as constituent units, a monomer (i) represented by the general formula (A2) shown below and one or more monomers (ii) selected from the group consisting of compounds represented by the general formulae (A3) above shown and the general formula (A4) shown below, having a molar ratio of (ii)/(i)=70/30 to 95/5;

(A2)

wherein $R^{3a}$ and $R^{4a}$ independently represent a hydrogen atom or a methyl group, p1 represents a number of 0 to 2, $A^3O$ represents an oxyalkylene group having 2 to 3 carbon atoms, n2 is a number of 100 to 300 that is the average number of moles of $A^3O$ added, and X represents a hydrogen atom or an alkyl group having 1 to 3 carbon atoms;

(A4)

wherein $R^{8a}$ represents a hydrogen atom or a methyl group, and Y represents a hydrogen atom or a cation;

<compound (3)>
a copolymer comprising, as constituent units, a monomer unit (iii) represented by the general formula (A5) shown below and one or more monomers (ii) selected from the group consisting of compounds represented by the general formulae (A3) and (A4) above shown, having a molar ratio of (ii)/(iii)=60/40 to 90/10;

(A5)

wherein $R^{9a}$ and $R^{10a}$ independently represent a hydrogen atom or a methyl group, p3 represents a number of 0 to 2, $A^4O$ represents an oxyalkylene group having 2 to 3 carbon atoms, n3 is a number of 2 to 90 that is the average number of moles of $A^4O$ added, and X represents a hydrogen atom or an alkyl group having 1 to 3 carbon atoms;

(B2)

wherein $A^1$ represents an alkylene group having 2 to 4 carbon atoms, m1, m2 and m3 each represent an integer indicating the number of moles of $A^1O$ added, wherein the average of the sum in total of m1, m2 and m3 of the mixture of compounds represented by the general formula (B2) is 0.5 to 2.5, and wherein 35% by weight or more of the mixture of compounds of the general formula (B2) possess a sum in total of m1, m2 and m3 that is an integer of 1 to 3.

3. The additive composition for a hydraulic composition according to claim 1 or 2, wherein a weight ratio of the total amount of the component (B) to the total amount of the component (A), (A)/(B), is from 15/85 to 96/4.

4. The additive composition for hydraulic composition according to claim 1, further comprising an antifoaming agent of dimethylpolysiloxane or polyalkylene glycol fatty acid ester.

5. A hydraulic composition, comprising the additive composition for a hydraulic composition according to claim 1, a hydraulic powder, aggregates and water.

6. The hydraulic composition according to claim 5, wherein the amount of component (A) is 0.01 to 10% by weight, and the amount of component (B) is 0.01 to 1% by weight, based on the hydraulic powder.

7. A concrete product, obtained by charging the hydraulic composition of claim 5 into a form, curing it and releasing the product from the form.

8. The additive composition for a hydraulic composition according to claim 1, wherein the mixture of compounds represented by the general formula (B2) comprises a mixture of glycerin adducts, wherein
    an amount of the glycerin adducts, to which 1 mole of alkylene oxide is added per 1 mole of glycerin, is 20 to 100% by weight, and
    an amount of the glycerin adducts, to which 0 mole of alkylene oxide is added per 1 mole of glycerin, is 0 to 41% by weight.

9. The additive composition for a hydraulic composition according to claim 1, wherein the average of the sum in total of m1, m2 and m3 of the mixture of compounds represented by the general formula (B2) is 0.9 to 2.1.

10. The additive composition for a hydraulic composition according to claim 2, wherein 50% by weight or more of the mixture of compounds of the general formula (B2) possess a sum in total of m1, m2 and m3 that is an integer of 1 to 3.

11. The additive composition for a hydraulic composition according to claim 2, wherein
    60% by weight or more of the mixture of compounds of the general formula (B2) possess a sum in total of m1, m2 and m3 that is an integer of 1 to 3 in the compounds of the general formula (B2), and
    the average of the sum in total of m1, m2 and m3 of the mixture of compounds represented by the general formula (B2) is 0.5 to 2.0.

12. The additive composition for a hydraulic composition according to claim 1 or 2, wherein a weight ratio of the total amount of the component (B) to the total amount of the component (A), (A)/(B), is from 25/75 to 80/20.

13. The additive composition for a hydraulic composition according to claim 1 or 2, wherein the monomers of the general formula (A3) are selected from the group consisting of acrylic acid, methacrylic acid and crotonic acid, maleic anhydride, maleic acid, itaconic anhydride, itaconic acid and fumaric acid, their alkali metal salts, alkaline earth metal salts, ammonium salts and mono, di, or trialkyl ammonium salts whose hydroxyl group may be substituted.

14. The additive composition for a hydraulic composition according to claim 1 or 2, wherein the monomers of the general formula (A2) are selected from the group consisting of esters of (meth)acrylic acid with polyalkylene glycol terminated with an alkyl group at one terminal, (meth)acrylic acid/ethylene oxide adducts and (meth)acrylic acid/propylene oxide adducts.

15. The additive composition for a hydraulic composition according to claim 1 or 2, wherein the compound (2) is obtained by copolymerizing the monomer (i) of the general formula (A2) and the monomer (ii) of the general formula (A3) and/or the general formula (A4) in a (ii)/(i) molar ratio of from 70/30 to 95/5.

16. An additive composition for a hydraulic composition, comprising:
(A) compound (2) shown below; and
(B) a mixture of compounds represented by the general formula (B2) shown below:
<compound (2)>
a copolymer comprising, as constituent units, a monomer (i) represented by the general formula (A2) shown below and one or more monomers (ii) selected from the group consisting of compounds represented by the general formulae (A3) shown below and the general formula (A4) shown below, having a molar ratio of (ii)/(i)=70/30 to 95/5;

(A2)

wherein $R^{3a}$ and $R^{4a}$ independently represent a hydrogen atom or a methyl group, p1 represents a number of 0 to 2, $A^3O$ represents an oxyalkylene group having 2 to 3 carbon atoms, n2 is a number of 100 to 300 that is the average number of moles of $A^3O$ added, and X represents a hydrogen atom or an alkyl group having 1 to 3 carbon atoms;

(A3)

wherein $R^{5a}$ to $R^{7a}$ independently represent a hydrogen atom, a methyl group or $(CH_2)_p 2COOM^2$, $M^1$ and $M^2$ independently represent a hydrogen atom or a cation, and p2 represents a number of 0 to 2;

(A4)

wherein $R^{8a}$ represents a hydrogen atom or a methyl group, and Y represents a hydrogen atom or a cation;

<General Formula (B2)>

(B2)

wherein $A^1$ represents an alkylene group having 2 to 4 carbon atoms, m1, m2 and m3 each represent an integer indicating the number of moles of $A^1O$ added, wherein the average of the sum in total of m1, m2 and m3 of the mixture of compounds represented by the general formula (B2) is 0.5 to 2.5, wherein, 60% by weight or more of the mixture of compounds of the general formula (B2) possess a sum in total of m1, m2 and m3 that is an integer of 1 to 3, and wherein a weight ratio of the total amount of the component (B) to the total amount of the component (A), (A)/(B), in the additive composition is from 25/75 to 80/20.

* * * * *